(12) United States Patent
Kwiatkowski et al.

(10) Patent No.: US 7,565,419 B1
(45) Date of Patent: Jul. 21, 2009

(54) CONFLICT RESOLUTION IN A PEER TO PEER NETWORK

(75) Inventors: Marc P. Kwiatkowski, San Jose, CA (US); Hans F. van Rietschote, Sunnyvale, CA (US); Mahesh Joshi, Maharashtra (IN)

(73) Assignee: Symantec Operating Corporation, Cupertino, CA (US)

(*) Notice: Subject to any disclaimer, the term of this patent is extended or adjusted under 35 U.S.C. 154(b) by 1295 days.

(21) Appl. No.: 10/302,291

(22) Filed: Nov. 22, 2002

(51) Int. Cl.
*G06F 15/173* (2006.01)

(52) U.S. Cl. .................. 709/223; 709/203; 709/217; 709/224

(58) Field of Classification Search ............. 709/203, 709/217, 219, 223–224
See application file for complete search history.

(56) References Cited

U.S. PATENT DOCUMENTS

| | | | |
|---|---|---|---|
| 5,557,798 A | 9/1996 | Skeen et al. | |
| 5,771,354 A | 6/1998 | Crawford | |
| 5,787,262 A * | 7/1998 | Shakib et al. | 709/205 |
| 5,884,308 A | 3/1999 | Foulston | |
| 6,038,601 A | 3/2000 | Lambert et al. | |
| 6,353,926 B1 | 3/2002 | Parthesarathy et al. | |
| 6,411,967 B1 | 6/2002 | Van Renesse | |
| 6,418,555 B2 | 7/2002 | Mohammed | |
| 6,425,126 B1 | 7/2002 | Branson et al. | |
| 6,457,076 B1 | 9/2002 | Cheng et al. | |
| 6,598,059 B1 * | 7/2003 | Vasudevan et al. | 707/203 |
| 6,768,740 B1 | 7/2004 | Perlman et al. | |
| 6,901,417 B2 * | 5/2005 | Anglin et al. | 707/203 |
| 6,944,642 B1 * | 9/2005 | Hopmann et al. | 709/203 |
| 2001/0032253 A1 | 10/2001 | Duxbury | |
| 2003/0074367 A1 | 4/2003 | Kaler et al. | |
| 2003/0182319 A1 * | 9/2003 | Morrison | 707/200 |
| 2004/0019640 A1 * | 1/2004 | Bartram et al. | 709/205 |
| 2004/0088646 A1 * | 5/2004 | Yeager et al. | 715/500 |
| 2005/0044187 A1 * | 2/2005 | Jhaveri et al. | 709/219 |
| 2005/0237941 A1 * | 10/2005 | Beers et al. | 370/236 |

OTHER PUBLICATIONS

Leslie Lamport, Massachusetts Computer Associates, Inc., "Time, Clocks, and the Ordering of Events in a Distributed System," Communications of the ACM, Jul. 1978, vol. 21, No. 7, pp. 558-565.

(Continued)

*Primary Examiner*—Lashonda T Jacobs
(74) *Attorney, Agent, or Firm*—Moser IP Law Group

(57) ABSTRACT

An apparatus comprises a plurality of nodes interconnected as peers in a peer-to-peer network. At least some nodes are configured to update an object, thereby generating a plurality of versions of the object. Any of the plurality of nodes is configured to detect a conflict between a first version and a second version of the plurality of versions, and any of the plurality of nodes is configured to provide an indication of a resolution of the conflict to other ones of the plurality of nodes. Each version may be identified by a version descriptor that includes a version identifier (ID) and a parent version ID. If the version is the result of a conflict resolution, the version descriptor may also include a resolved version ID identifying the losing version. The resolved version ID may be used to prevent the raising of the same conflict after it has been resolved.

43 Claims, 11 Drawing Sheets

OTHER PUBLICATIONS

Vincent D. Park and M. Scott Corson, Naval Research Laboratory, Univ. of Maryland, "A Highly Adaptive Distributed Routing Algorithm for Mobile Wireless Networks," IEEE, 1997, 9 pages.

Hung-Chang Hsiao and Chung-Ta King, Dept. of Computer Science, National Tsing Hua Univ., "Modeling and Evaluating Peer-to-Peer Storage Architectures," IEEE, 2002, 6 pages.

Rob R. Hoogerwoord, "Leslie Lamport's Logical Clocks: a tutorial," Jan. 29, 2002, pp. 1-26.

Federal Information, Processing Standards Publication 180-I, "Secure Hash Standard," Apr. 17, 1995, 17 pages.

TIBCO Software, Inc., "TIBCO Messaging Solutions," 2002, 2 pages.

BitMover, Inc., "BitKeeper, Source Management," 1997-2001, 42 pages.

CollabNet, Inc., "CVS—Concurrent Version System v1.11.2," 1999-2002, 247 pages.

"Times Consistency for Shared Distributed Objects," Torres-Rojas, et al., May 1999, Proceedings of the $18^{th}$ annual ACM symposium of Principle of distributed computing, pp. 163-172.

"Concurrent Reading and writing of Clocks," Leslie Lamport, ACM Transactions on Computer Systems, vol. 8, No. 4, Nov. 1990, p. 305-310.

\* cited by examiner

CONFLICT RESOLUTION IN A PEER TO PEER NETWORK

BACKGROUND OF THE INVENTION

1. Field of the Invention

This invention is related to the field of peer-to-peer networks and, more specifically, to handling the update of objects in a peer-to-peer network.

2. Description of the Related Art

Peer-to-peer networks are one model for linking a set of nodes (e.g. computer systems) into a system. In peer-to-peer networks, the nodes may typically have equivalent responsibilities and capabilities (as compared to a client-server network, in which certain server nodes have specified functions that those nodes provide for the other nodes). In some cases, the nodes may acquire various responsibilities/capabilities in the system and release the responsibilities/capabilities as they see fit.

Various objects may be shared among the nodes in a peer-to-peer network. That is, various nodes in the peer-to-peer network may have copies of the objects. If an object may be updated by the nodes, then a mechanism for ensuring that the updates are consistently applied to the object is needed. Typically, peer-to-peer networks have employed one of two mechanisms: coherent updates or a central server to manage versions of the object.

In a coherent update system, an object may have one owner at any given time. The owner is the one to have mostly recently updated the object, and has the most recent copy of the object. Other nodes may request a copy of the object from the owner. If another node is to modify the object, the node obtains an exclusive copy of the object from the owner (thus becoming the new owner). Once the updates are made by the new owner, the updates may be shared with other nodes.

In a peer-to-peer network, there is no guarantee that the owner of an object can be located. For example, the network may partition occasionally into two or more sections (the sections are referred to as partitions). The partitions, at least temporarily, cannot communicate with each other. For example, a partition may be formed due to a device, such as a router or switch, within the network failing (e.g. crashing or failing permanently). A partition may be formed due to interconnect failure within the network (e.g. a cut line), corruption of routing table information, power failure in the power system supplying a portion of the network, etc. Once the failure is corrected, the partition is said to "heal" by reestablishing communication paths between the nodes that were previously in separate partitions. If an owner of an object is in one partition and the node requesting the object is in another partition, the owner cannot be found until the partition heals.

With a central server system, requests for versions of the object are routed to a central server node which controls access to the object. There may be a hierarchical structure to the central server (e.g. request servers that receive requests from various subsets of the nodes), but the central server still manages the versions.

In a peer-to-peer network, as the number of nodes grows, the central server may become a bottleneck to the performance of the network as a whole. That is, nodes may wait for longer periods of time before being granted a version of a requested object. Furthermore, the central server system is subject to partitioning as well, and thus some nodes may, at least temporarily, lose the ability to acquire a version of an object.

SUMMARY OF THE INVENTION

In one embodiment, an apparatus comprising a plurality of nodes interconnected as peers in a peer-to-peer network. At least some of the plurality of nodes are configured to update an object, thereby generating a plurality of versions of the object. Any of the plurality of nodes is configured to detect a conflict between a first version of the plurality of versions and a second version of the plurality of versions, and any of the plurality of nodes is configured to provide an indication of a resolution of the conflict to other ones of the plurality of nodes. In some embodiments, each version is identified by a version descriptor that includes a version identifier (ID) and a parent version ID. If the version is the result of a conflict resolution, the version descriptor may also include a resolved version ID identifying the losing version in the conflict resolution. The resolved version ID may be used to prevent the raising of the same conflict after it has been resolved.

In another embodiment, an apparatus comprises a plurality of nodes interconnected as peers in a peer-to-peer network. At least some of the plurality of nodes are configured to update an object, thereby generating a plurality of versions of the object. Each of the plurality of nodes that generates one of the plurality of versions is configured to locally generate a version identifier corresponding to that one of the plurality of versions. The plurality of nodes are configured to detect conflicting updates in the plurality of versions responsive to the version identifiers corresponding to the conflicting updates. Methods and computer accessible media storing instructions which, when executed, perform the methods are also contemplated.

BRIEF DESCRIPTION OF THE DRAWINGS

The following detailed description makes reference to the accompanying drawings, which are now briefly described.

Figure 1:
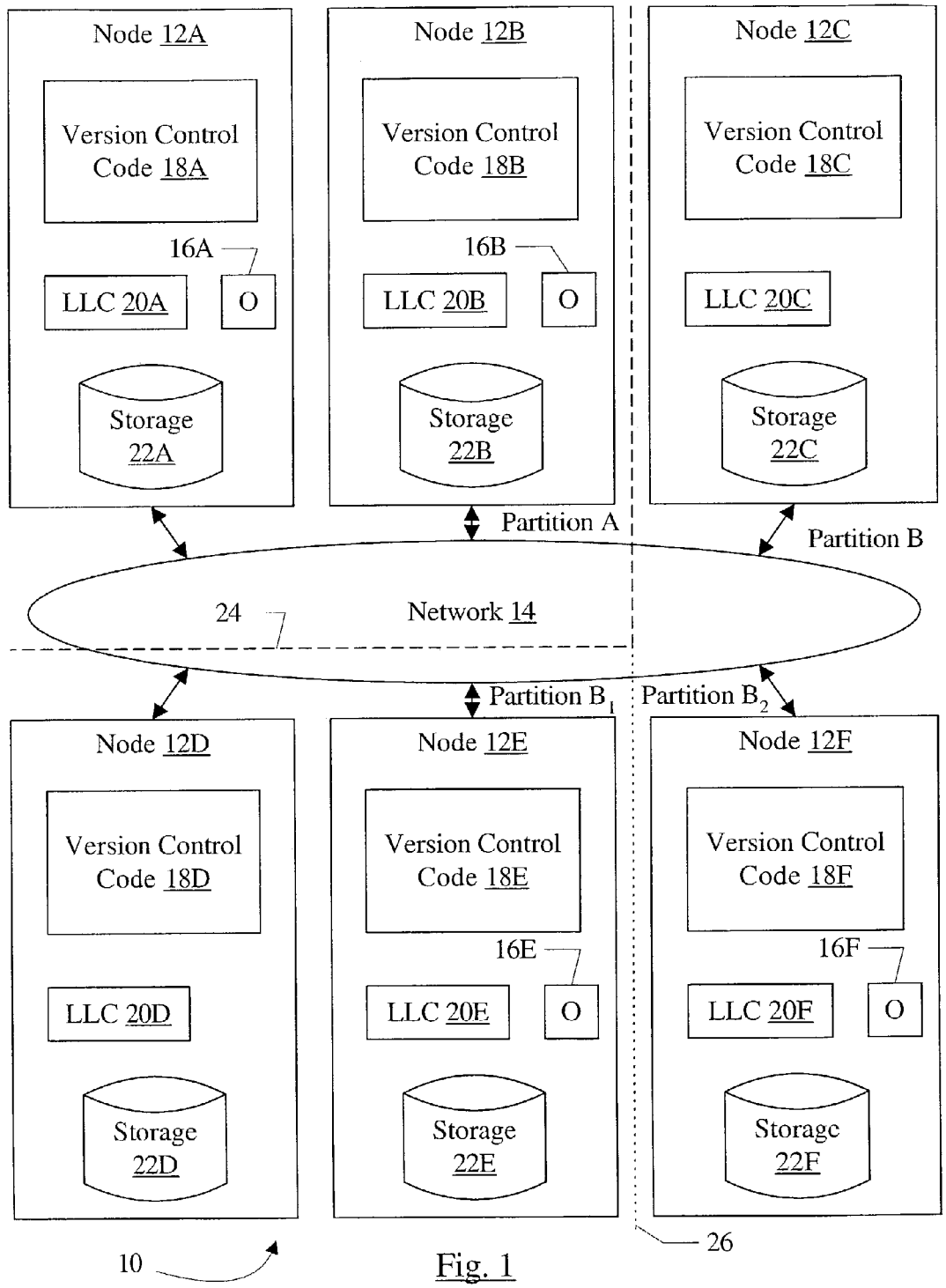
FIG. 1 is a block diagram of one embodiment of a peer-to-peer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of a peer-to-peer network 10 including a plurality of nodes 12A-12F interconnected via a network 14 is shown. One or more of the nodes 12A-12F may have a version of an object O (e.g. reference numerals 16A, 16B, 16E, and 16F illustrated in nodes 12A, 12B, 12E, and 12F, respectively in FIG. 1). The versions in various nodes 12A-12F may be the same version, or one or more nodes 12A-12F may have different versions if a node or nodes has updated the object O.

Generally, the nodes 12A-12F that update the object O are configured to generate new versions of the object O. Any of the nodes 12A-12F may detect a conflict between versions of the object O. For example, when a given node 12A-12F is informed of an update to the object O by another node 12A-12F, the given node 12A-12F may detect a conflict between the updated version and the current version maintained in that given node 12A-12F. Additionally, when the conflict is resolved, any of the nodes 12A-12F is configured to propagate an indication of the resolution to other nodes 12A-12F. The node 12A-12F that propagates the indication may be the node 12A-12F in which the resolution is determined (e.g. via a software or hardware selection of a winning version or via a manual resolution by a user on that node 12A-12F). The nodes 12A-12F may use the indication of resolution to prevent reporting (or raising) the conflict again if another node 12A-12F detects the same conflict. In one embodiment, the version control code 18A-18F illustrated in the nodes 12A-12F, respectively, may comprise instructions which, when executed, provide the conflict detection/resolution functionality in each node 12A-12F.

Since any node may detect a conflict and propagate an indication of the resolution, conflict detection and resolution may be decentralized in the peer-to-peer network 10. Thus, even if the network partitions, conflicts may be detected and resolved when the partition heals. During the partition, nodes may still have access to objects and the ability to make updates to those objects. Furthermore, the conflict detection and resolution may be scalable to any desired number of nodes.

As used herein, a conflict (or conflicting update) may occur between two versions if the update represented by one version is not consistent with the content of the other version. For example, two updated versions derived from the same parent version may be inconsistent, since each updated version does not include the other update. Furthermore, an updated version that is not derived (directly or indirectly) from a previous version may be inconsistent with the previous version since the update may not include the content of the previous version (e.g. for portions of the object that are not affected by the update). In some embodiments, an updated version that is not a descendent of a previous version may not be detected as a conflict if the content of the updated version and the previous version is the same.

Conflicts may occur for a variety of reasons. For example, in some embodiments, no attempt may be made by the nodes 12A-12N to ensure that they have the most recent version of an object when an update is performed. In embodiments in which conflicting updates are unlikely, for example, such a scheme may be sufficient. Additionally, even in embodiments in which nodes 12A-12N attempt to get the most recent version to perform an update, conflicts may occur when the network 14 partitions. For example, in FIG. 1, a partition may occur in the network (illustrated as the dashed line 24). The nodes 12A-12B may form partition A, while the nodes 12C-12F may form partition B. Subsequently (indicated by the dotted line 26), partition B may further divide into partition $B_1$ (nodes 12D-12E) and partition $B_2$ (nodes 12C and 12F). After partitioning into partitions A and B (but before partitioning into partitions $B_1$ and $B_2$), conflicting updates may be made to versions of the object in partition A as compared to the versions in partition B. For example, one or both of the objects 16A and 16F may be updated in a conflicting fashion. Similarly, after partitioning into partitions $B_1$ and $B_2$, conflicting updates may be made to versions of the object in partition $B_1$ as compared to the versions in partition $B_2$, both of which may be derived from an update in partition B that conflicts with an update in partition A (e.g., an update to object 16E, derived from the object 16F updated in conflicting fashion as mentioned above, may conflict with further updates to the object 16F). During partition healing, versions of objects that existed on both sides of a partition may be resolved.

When a conflict is detected between two versions of an object, resolving the conflict may involve selecting one of the versions to be the "winning version" (the version whose contents are retained). The winning version may be indicated as a new version of the object. The "losing version" (the version whose contents are discarded) may also be noted so that the conflict between the winning version and the losing version may not be reasserted. The winning version may be selected arbitrarily, for example, but in a consistent fashion so that each node 12A-12F may generate the same selection if that node resolves the conflict. For example, the older or the newer of the versions may be selected. Alternatively, user intervention may be used to resolve some conflicts, and the user may specify the winning version.

The nodes 12A-12F may employ any mechanism for informing each other of new versions of an object. Since the nodes 12A-12F are peers in the peer-to-peer network 10, there may be no predefined source for the object. At various times, any node or nodes 12A-12F may have a most recent version of the object, and may be responsible for the object. For example, an updating node 12A-12F may broadcast an indication of the updated object to the other nodes 12A-12F. Alternatively, nodes may poll other nodes to locate versions of the object. In another alternative, a subset of the nodes 12A-12F may act as a distributed database for the object, maintaining replicas of a current version. Any node in the subset may provide a version of the object to a requestor. In yet another alternative, a node 12A-12F may randomly select nodes 12A-12F to check for versions of an object.

In one embodiment, if a node 12A-12F updates an object, the version control code 18A-18F in that node 12A-12F locally generates a new version identifier for the object. That is, the version control code 18A-18F does not require access to any other node to generate the version identifier. The new version identifier identifies the version uniquely in the peer-to-peer network 10. The version identifiers corresponding to various versions may be compared to detect conflicts.

In one implementation, the version identifiers may include a logical timestamp indicative of the logical time at which an update that caused a new version occurs. Generally, a logical timestamp includes any logical value that permits events in different nodes to be ordered with respect to each other. The logical time may not be correlated to the physical time (or real time) at which the events occur. For example, in one embodiment, the logical timestamps may be Lamport Logical Clock (LLC) timestamps. Each node 12A-12F may maintain an LLC (reference numerals 20A-20F in the nodes 12A-12F, respectively). The LLC may be a value stored in a register within a processor in the node, or in a memory location in a memory system in the node, for example. The value of the LLC 20A-20F in a node 12A-12F at the time a version is generated may be used as the LLC timestamp. The LLC may be changed, such that subsequent events may be viewed as occurring logically after the generation of the version. For example, the LLC may be incremented. Additionally, if a message is received from another node (e.g. an indication of an updated version of the object, or other message for which logical ordering is desired) and the LLC timestamp of that message is greater than the current LLC in the node, the node's LLC is advanced to be greater than the LLC timestamp of the message (e.g. the LLC timestamp of the message incremented by one) if the current LLC is not already greater. The LLC timestamps in the version identifiers may be used to compare version identifiers, to determine which version was generated earlier in logical order. The version identifiers may be used to detect conflicting updates and to record resolved conflicts. Additional details for one embodiment are provided further below.

Comparisons of LLCs (and LLC timestamps) may result in a first LLC being less than a second LLC, equal to the second LLC, or greater than the LLC. If the first LLC is less than the second LLC, the first LLC is viewed as being earlier in logical time than the second LLC. Similarly, if the first LLC is greater than the second LLC, the first LLC is viewed as being later in logical time than the second LLC. If the first LLC is equal to the second LLC, the same logical time is being expressed by both LLCs. In terms of version IDs, if a first LLC timestamp is less than a second LLC timestamp, the version corresponding to the first LLC timestamp is logically before the version corresponding to the second LLC timestamp. If the first LLC timestamp is greater than the second LLC timestamp, the version corresponding to the first LLC timestamp is logically after the version corresponding to the second LLC timestamp. The preceding discussion assumes that the LLC is increased to progress logical time. If embodiments employ a decrease in LLC to progress logical time, the opposite numerical interpretations to those presented above may be used to determine the order of versions.

Generally, an object may be any uniquely identifiable and persistent data that may be shared among the nodes 12A-12F. That is, versions of the object may be stored in two or more of the nodes 12A-12F. Several exemplary objects are described below (storage objects, files in a content management system, events in a reliable message system, and workflow objects in a workflow system). The term object will be used for the remainder of the disclosure, and is intended to cover the above examples as well as any other type of object. A node, as used herein, may include one or more computer systems. A computer system may include one or more processors that execute the instructions comprising the software installed on the computer system, as well as other hardware (e.g. memory, nonvolatile storage devices such as disk drives, other peripherals, etc.). In some implementations, nodes may also include a storage device or devices (e.g. network attached storage (NAS) or storage area network (SAN) devices). The network 14 may include at least communication media between the nodes 12A-12F (e.g. cable, fiber optic, wire, etc.). The network 14 may further include various communication and/or network devices (e.g. routers, switches, firewalls, modems, etc.). In various embodiments, the network 14 may be a wide area network (WAN), local area network (LAN), metropolitan area network (MAN), or combinations of the above.

In some embodiments, objects may be storage objects (e.g. directories and files of a file system implemented across the nodes 12A-12F, or blocks of fixed or variable size if the nodes 12A-12F implement a virtual block storage device for storage objects shared among the nodes 12A-12F). In such embodiments, the peer-to-peer network 10 may be a peer-to-peer storage network. The nodes 12A-12F may share all or part of the respective storage devices 22A-22F, and the file system of the storage network ay be mapped onto the shared storage. Storage objects may be data in the peer-to-peer network 10, versions of which may be stored on one or more of the storage devices 22A-22F. That is, the objects 16A, 16B, 16E, and 16F may be storage objects stored on the storage devices 22A, 22B, 22E, and 22F respectively.

In other embodiments, objects may be files in a content management system executing on the peer-to-peer network 10. The content management system may be used to detect conflicting updates to the files that store the content being managed (e.g. the files may be software, document files such as word processor files or spreadsheets, or displayable content such as web page files). The conflicts may be resolved, and updates that are resolved as the loser of the conflict may be reapplied to the resolved file if desired.

In still other embodiments, the nodes 12A-12F may implement a reliable messaging system. In a reliable messaging system, subscribers may subscribe to an event. Updates to the event may be messages related to the event (e.g. an event may be a package in a package delivery system, and messages may update the progress of the package toward delivery). The reliable messaging system may ensure that the messages are relayed to the subscribers, even if the subscribers are partitioned from the network at the time the message is generated.

In yet other embodiments, the nodes 12A-12F may implement a workflow system in which a workflow object is passed from node to node, each of which may update the object to move the workflow object toward completion. For example, a workflow object may be an expense report. The expense report may be generated by the employee who incurred the expense, be approved by the employee's manager, be approved by the human resources department after the manager approves it, and be paid by the accounting department. The employee, the manager, the human resources department, and the accounting department may all access the expense report at different nodes. Any of the aforementioned may modify the expense report after it has been passed on to the next node in the workflow, and the modification may be detected as a conflicting update at any point. The conflict may be resolved by updating expense report with the changes or returning the expense report to the spot in the workflow where the conflict was generated, to resume the workflow there.

It is noted that, while 6 nodes are illustrated in FIG. 1, various embodiments may have more or fewer nodes, as desired.

Figure 2:
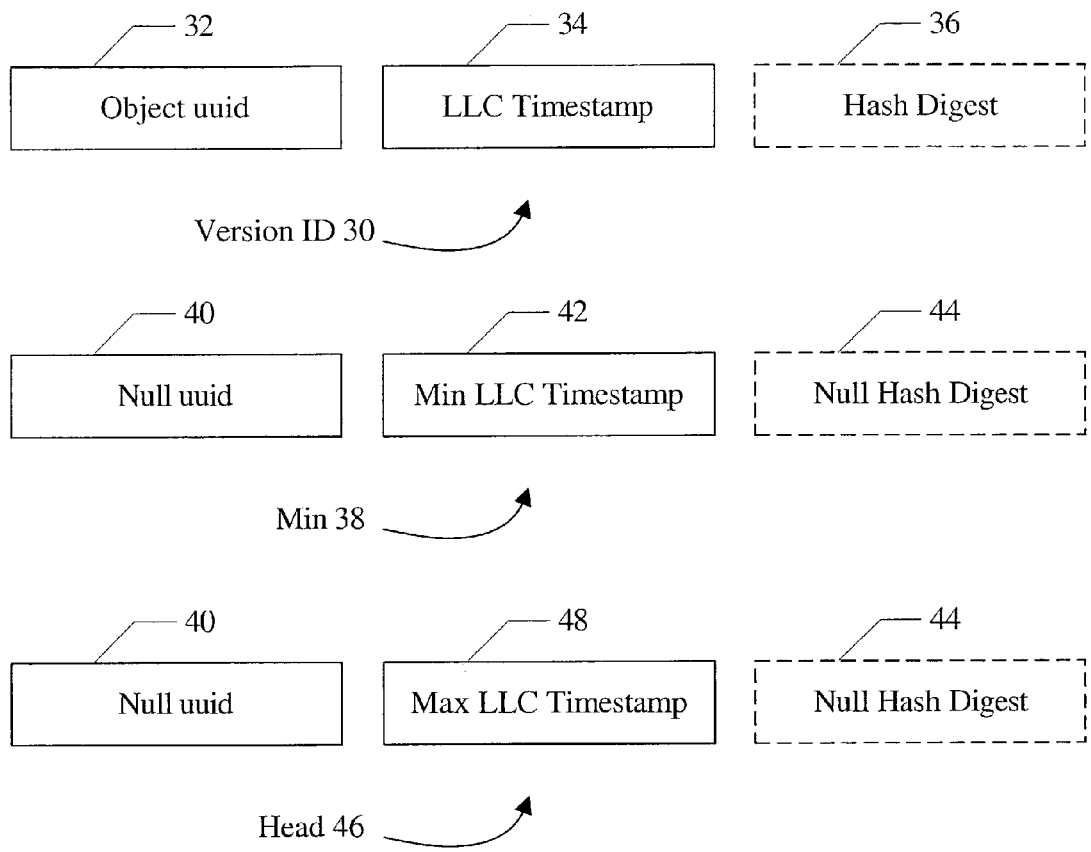
FIG. 2 is a block diagram of one embodiment of a version identifier, including two special version identifiers.

Turning now to FIG. 2, a block diagram of one embodiment of a version identifier (ID) 30 is shown. Generally speaking, a version identifier may be any value or values that uniquely identify a version of an object. In the illustrated embodiment the version ID 30 includes an object identifier 32, an LLC timestamp 34, and an optional hash digest 36.

The object identifier 32 is any value that uniquely identifies a given object among other objects. For example, in FIG. 2, the object identifier 32 may comprise a universally unique identifier (uuid) assigned to the object. A uuid is commonly used on the Internet as an unique identifier. Other embodiments may use any other value (e.g. uniquely assigned names).

The LLC timestamp 34 is the timestamp mentioned above with respect to FIG. 1. The LLC timestamp 34 permits comparison of various version IDs to determine ordering of the versions. That is, the LLC timestamp 34 defines an order among the version IDs, even though the version IDs may have been generated by different nodes. The order may be unambiguous (that is, any node may arrive at the same ordering of a set of version IDs).

The hash digest 36 may be used to detect different versions (as indicated by the LLC timestamps 34 in the respective versions IDs) that actually have the same content. For example, if the same update is made by nodes in different partitions, and then the partitions heal, the versions are not actually conflicting (even though the LLC timestamps may differ). The hash digest 36 may be a hash of the content of the object, and thus if the hash digests are the same then the content may be the same. Any hash algorithm may be used, although in one embodiment the secure hashing algorithm-1 (SHA-1) may be used. The hash digest 36 is optional, and may be eliminated in some embodiments.

One or more "special" version IDs may be defined for use by the nodes 12A-12F in communicating version information among the nodes. The minimum version ID (Min) 38 may be used as the parent version for the initial version of an object. Additionally, the Min version ID 38 may be used in messages between nodes. For example, if a node inquires another node regarding an object, the other node may reply with the Min version ID 38 to indicate that the node is aware of the existence of the object, but does not have a head version for the object. In the illustrated embodiment, the Min version ID 38 includes a null uuid 40 and a minimum LLC timestamp 42. The minimum LLC timestamp 42 may be less than any other value of the LLC. If the hash digest is included in version IDs, the Min version ID 38 includes a null hash digest 44.

Another special version ID in the present embodiment is the head version ID 46. The head version ID 46 may be used to request that a node return its current head version, for example. In the illustrated embodiment, the head version ID 46 includes the null uuid 40 and optionally the null hash digest 44, similar to the Min version ID 38. The head version ID 46 may also include a maximum LLC timestamp 48. The maximum LLC timestamp 48 may be greater than any other value of the LLC.

It is noted that the order of values illustrated in FIG. 2 may be varied in other embodiments (e.g. the LLC timestamp 34 may be presented first, followed by the object uuid 32 and the hash digest 36 in either order; or the hash digest 36 may be presented first, followed by the uuid 32 and the LLC timestamp 34 in either order).

The LLC 20A-20F may, in some embodiments, be used by the nodes 12A-12F for ordering other events. Additionally, even if the LLCs 20A-20F are used exclusively for version ID generation, the LLCs in a tree of versions may not be monotonically increasing (e.g. if partitions occur, the LLCs in the different partitions may differ). Accordingly, in this embodiment, a given version of an object may be more fully described using a version descriptor. Generally, a version descriptor comprises one or more version IDs 30.

Figure 3:
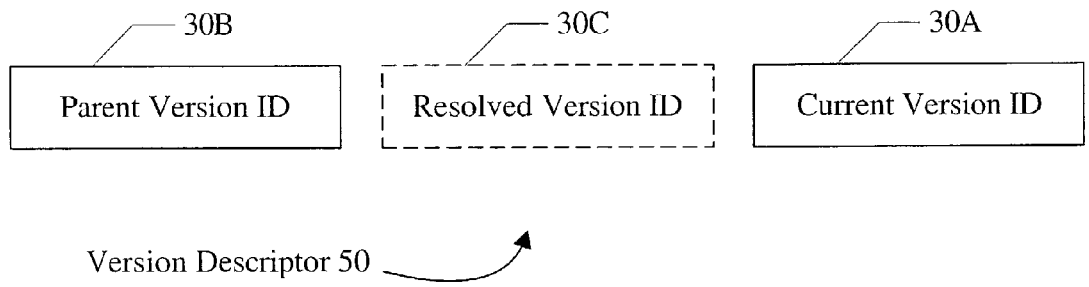
FIG. 3 is a block diagram of one embodiment of a version descriptor.

FIG. 3 is a block diagram of one embodiment of a version descriptor 50. The version descriptor 50 illustrated in FIG. 3 includes at least a current version ID 30A and a parent version ID 30B. Optionally, the version descriptor 50 may include a resolved version ID 30C. Each of the current version ID 30A, the parent version ID 30B, and the resolved version ID 30C may be instantiations of version identifiers 30. If the version descriptor 50 corresponds to an initial version of an object, the parent version ID 30B may be the Min version ID 38 shown in FIG. 2. If the object is a well-known object (that is, a predefined object that is known to all nodes 12A-12F), the current version ID 30A of the initial version may have an LLC timestamp of zero (e.g., the lowest timestamp other than the minimum timestamp). If the object is a derived object (derived from a well known object), the current version ID 30A of the initial version may have an LLC timestamp that is greater than the parent object from which it is derived.

The current version ID 30A is the version ID generated by a node 12A-12F when that node 12A-12F updates the object (thus creating a new version), or is the version ID supplied with the updated object to the node 12A-12F, if the node receives the updated object from another node. Thus, the current version ID 30A is the version ID corresponding to the current version held by the node 12A-12F. The parent version ID 30B is the version ID corresponding to the version of the object from which the current version was derived. That is, the parent version is the version of the object that was modified by a node 12A-12F to create the current version.

The optional resolved version ID 30C may be included in a version descriptor 50 of a version of the object that is created as the resolution of a conflict. That is, when a conflict is resolved, the resolving node 12A-12F may generate a new version ID for the resolved version. The new version ID is used as the current version ID 30A in the version descriptor 50 corresponding to the resolved version. The parent version ID 30B in the version descriptor 50 corresponding to the resolved version may be the version ID of the winning version. The version ID of the losing version may be recorded as the resolved version ID 30C in the version descriptor 50 corresponding to the resolved version. Thus, if another node 12A-12F has a current version equal to the resolved version ID 30C, that node may inhibit raising a conflict for the object (and thus a given conflict may be raised and resolved once even if detected multiple times).

It is noted that the order of version IDs shown in the version descriptor 50 is merely exemplary. Any order of the version IDs may be used.

Figure 4:
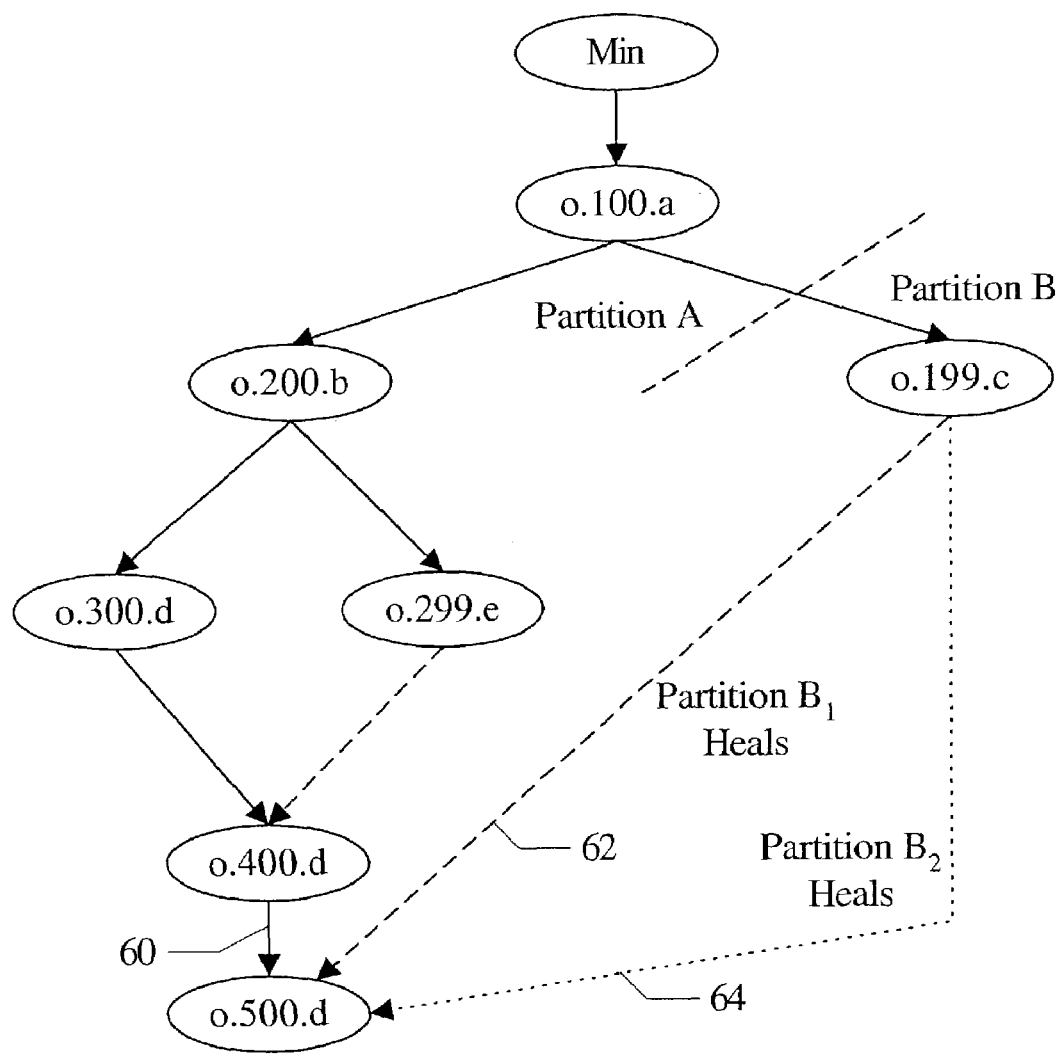
FIG. 4 is a block diagram illustrating exemplary versions of an object.

Turning next to FIG. 4, a block diagram illustrating various exemplary versions of the object O illustrated in FIG. 1 (in a version tree) and resolving of conflicts in the versions is shown. The partitioning in the example of FIG. 4 is based on the exemplary partitioning illustrated in FIG. 1. Each version is illustrated as an oval in FIG. 4. The version ID is illustrated within the oval as three values separated by periods. The object uuid is shown (illustrated simply as "o" in FIG. 4 for convenience), followed by the LLC timestamp and then the hash digest. The hash digest is illustrated simply as various lower case letters for convenience, where the same lower case letter is used to represent the same hash digest and different lower case letters are used to illustrated different hash digests. Parent version ID relationships are illustrated by solid arrows in FIG. 4, with the parent at the tail of the arrow and the child at the head of the arrow (e.g. the parent version ID of o.100.a is Min, and the parent version ID of o.200.b is o.100.a). Thus, a version descriptor 50 for a given version of the object may include the version ID in the oval corresponding to that version as the current version ID 30A and the version ID of the parent (as indicated by the solid arrow having its head at the oval) as the parent version ID 30B. The losing version is indicated by a dashed arrow having its head at the oval corresponding to the resolved version and its tail at the oval corresponding to the losing version.

Generally, a version tree for a given version of the object O is the history of versions that led to the given version, and the order of those versions. For example, the version o.300.d is derived from the version o.200.b, which is derived from the version o.100.a, which is the initial version (its parent is the Min version ID 38, illustrated as "Min" in FIG. 4).

In this example, the initial version of the object O (o.100.a) is created prior to any partitioning in the peer-to-peer network 10, and has the Min version ID 38 as its parent. The various nodes 12A, 12B, 12E, and 12F may all have a copy of the same version. The peer-to-peer network 10 may then partition into partitions A and B. Within partition A, a version o.200.b may be derived from version o.100.a, while a different version o.199.c may be derived from the version o.100.a in partition B.

FIG. 4 also illustrates an example in which conflicting versions are permitted within a partition. In other embodiments, the nodes 12A-12F may prevent the generation of conflicts within a partition via the object communication protocol implemented by the nodes 12A-12F. In FIG. 4, conflicting versions o.300.d and o.299.e are derived from the same parent version o.200.b. For example, node 12A may generate version o.300.d and node 12B may generate version o.299.e. One of the nodes 12A-12B detects the conflict (e.g. when the other node transmits an indication of its update to that node) since the version ID received by that node does not have the current version in its version tree (and thus the received version ID identifies a version that is not derived from the current version in the node). The detection is independent of which node receives an indication of the other node's version. The conflict is resolved with version o.300.d as the winning version and o.299.e as the losing version in this example. A new version is created by the resolving node (o.400.d) with the winning version (o.300.d) as the parent version and the losing version (o.299.e) as the resolved version. Thus, a solid arrow is shown between the oval containing version ID o.300.d to the oval containing version ID o.400.d and a dashed arrow is shown between the oval containing version ID o.299.e and the oval containing version ID o.400.d. Note that, since o.300.d is the winning version, the version digest (d) is the same in both version IDs o.400.d and o.300.d. That is, the resolved version has the same content as the winning version in this embodiment.

Partition B is partitioned into partitions $B_1$ and $B_2$, and subsequently partition $B_1$ heals with partition A. During the healing of partition $B_1$, conflicts for objects that exist in both partitions are resolved. In particular, a conflict for the object O is detected between the version o.199.c (e.g. in the node 12E) and the version o.400.d (e.g. in the node 12B). The conflict is resolved with the version o.400.d as the winning version and o.199.c as the losing version, and a new version o.500.d is created by the resolving node. Note that detecting the conflict occurs independent of which node detects the conflict. For example, if the node 12B receives the version descriptor for version o.199.c, the node 12B detects that o.400.d is not in the version tree of o.199.c and thus there may be a conflict. If the node 12E receives the version descriptor for version o.400.d, the node 12E detects that o.199.c is not in the version tree of o.400.d. The new version o.500.d has version o.400.d as its parent version ID (solid arrow 60) and version o.199.c as its resolved version ID (dashed arrow 62).

Subsequently, the partition $B_2$ heals with the remainder of the peer-to-peer network 10. The partition $B_2$ has the same version (o.199.c) that the partition $B_1$ had in this example. During the healing of partition $B_2$, a conflict may be detected between the version o.199.c and the version o.500.d (illustrated by the dotted line 64 in FIG. 4). However, since the version o.199.c is the resolved version ID of the version o.500.d, no conflict is raised.

It is noted that, while the conflicting version o.199.c is found as the resolved version ID of the current version (o.500.d) in the healed partition, there may be one or more versions between the current version and a version that has the conflicting version as its resolved version ID and a conflict may still not be raised.

FIGS. 5-10 illustrate one embodiment of the version control code that may be included in each node. That is, each node 12A-12F may include a copy of the version control code (illustrated as version control code 18A-18F in FIG. 1) that may operate in the fashion described in FIGS. 5-10 for this embodiment. Thus, the version control code 18 will be referred to below and it is understood that the copies of the version control code 18A-18F may each implement the function described. Similarly, the node 12 on which the version control code 18 is executing may be referred to, and it is understood that the node 12 may generally refer to any node 12A-12F executing its copy of the version control code 18A-18F. Each flowchart is representative of one or more instructions in the version control code 18 which, when executed in a node 12, cause the function illustrated in the flowchart to occur within that node. It is noted that, in other embodiments, a portion or all of the version control code 18 may be implemented in hardware, if desired.

FIGS. 5-10 may refer to one version ID of an object being greater or less than another version ID of the object. A first version ID is greater than a second version ID if the first version ID identifies a version that is logically after the version identified by the second version ID (e.g. the first version ID's LLC timestamp is greater than the second version ID's LLC timestamp). Similarly, a first version ID is less than a second version ID if the first version ID identifies a version that is logically before the version identified by the second version ID (e.g. the first version ID's LLC timestamp is less than the second version ID's LLC timestamp). Version IDs may be equal if they identify the same version (e.g. the LLC timestamps are equal and, if the hash digest is included, the hash digests are equal).

Figure 5:
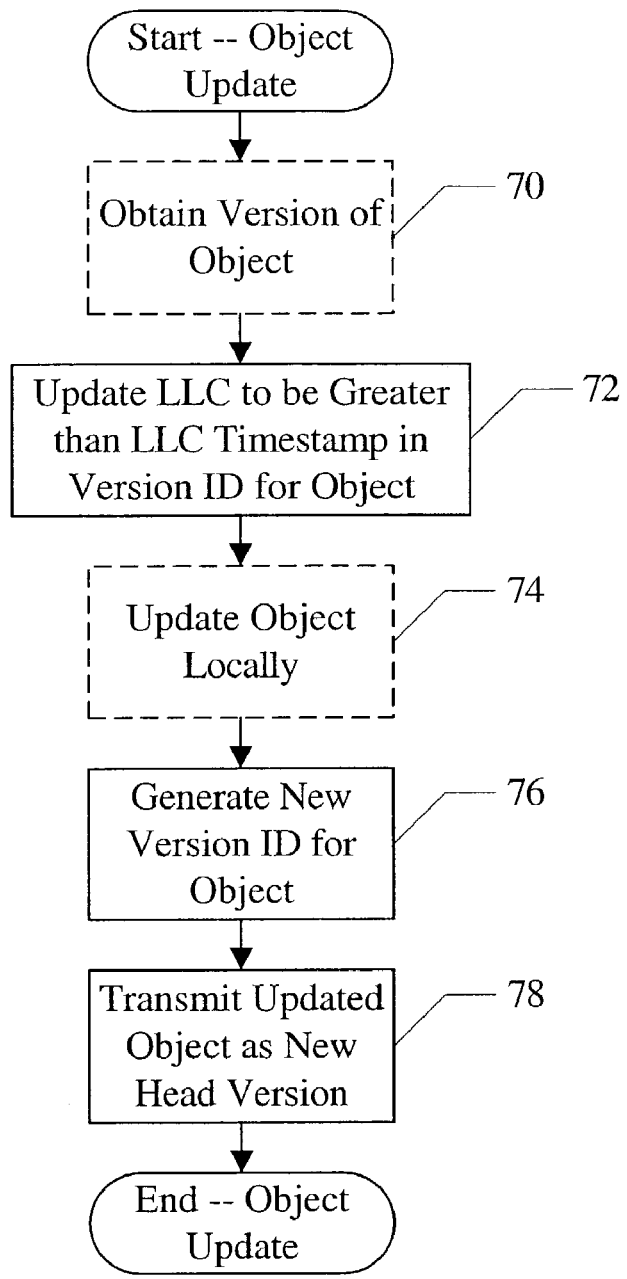
FIG. 5 is a flowchart illustrating operation of a first portion of one embodiment of the version control code shown in FIG. 1 when an object is updated locally.

FIG. 5 is a flowchart illustrating operation of the version control code 18 when the node 12 decides to update the object. Blocks illustrated in dashed boxes in FIG. 5 may represent the operation of other code within the node 12 (not shown) to provide context for operation of the version control code 18. While the blocks shown in FIG. 5 are illustrated in a particular order to ease understanding, other orders may be used. Furthermore, blocks may be performed in parallel, in some embodiments.

The node 12 obtains a version of the object (block 70). As mentioned above with regard to FIG. 1, there are a variety of mechanisms for communicating versions of an object among the nodes (e.g. broadcasting a request, polling individual nodes, creating subsets of nodes that maintain copies, etc.). Any mechanism may be used. In some embodiments, the block 70 may be code separate from the version control code 18 (as the dashed box 70 illustrates). Alternatively, the block 70 may be included in the version control code 18 in other embodiments.

The version control code 18, in response to receiving a copy of the object (which includes a version descriptor including the current version ID) may update the LLC 20 in the node 12 to be greater than the LLC timestamp in the current version ID of the object (block 72). In this manner, a new version ID generated for the object may have an LLC timestamp greater than the current version. If the LLC 20 is already greater than the LLC timestamp, then no update may be performed.

The node 12 updates the object locally (block 74). The node 12 may perform one or more updates to the object, as desired. At some point, the node 12 may be prepared to present its updates to the other nodes in the peer-to-peer network 10 as a new version of the object. At that point, the node 12 may use the version control code 18 to generate version ID for the object (block 76) and may transmit the updated object as the new head version of the object (block 78). The updated object may be accompanied by the version descriptor 50 for the object, which includes the newly generated version ID (from block 76) as the current version ID 30A and the current version ID from the version descriptor of the version of the object obtained at block 70 as the parent version ID 30B. Alternatively, only the version descriptor may be transmitted. Another node may subsequently acquire a copy of the updated version from the node 12, if desired.

As mentioned previously, the version control code 18 generates the new version ID (block 76) for the updated version of the object locally. That is, the version control code 18 need not consult other nodes or any hypothetical central server of version IDs to generate the version ID. It is noted that the version control code 18 may generate the new version ID prior to the node 12 updating the block locally, or in parallel with the local updates.

In some embodiments, a node 12 may be permitted to transmit its updated version without declaring the updated version as the new head version. In such a case, a new version ID is still generated and transmitted with the updated version (as the current version ID of the version descriptor, with the current version ID from the version descriptor received in block 70 as the parent version ID of the version descriptor). Multiple versions may be generated and transmitted before attempting to set a new head version.

As used herein, a version of an object is a head version if the other nodes in the peer-to-peer network 10 accept the version as the most up-to-date version of the object. That is, the head version, once accepted, supercedes earlier versions of the object.

Figure 6:
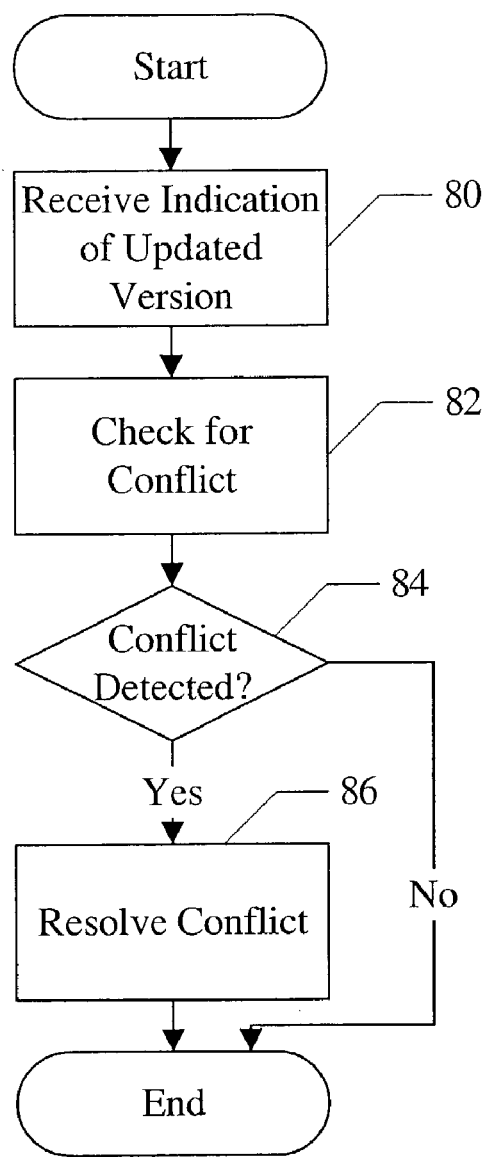
FIG. 6 is a flowchart illustrating operation of a second portion of one embodiment of a version control code for receiving an indication of an updated object.

Turning now to FIG. 6, a flowchart illustrating operation of one embodiment of the version control code 18 in response to the node 12 receiving an indication of an updated version of an object is shown. There may be a variety of ways that a node 12 may receive the indication. For example, another node 12 may transmit a new head version of the object. Alternatively, another node may transmit an updated version of the object without indicating that the version is a new head version. Still further, during partition healing, a node may receive an indication of the current version of the object existing in the other partition. Generally, the indication of the updated version (e.g. the version descriptor for the update) may be received with a copy of the updated version, or separate from a copy of the updated version. While the blocks shown in FIG. 6 are illustrated in a particular order to ease understanding, other orders may be used. Furthermore, blocks may be performed in parallel, in some embodiments.

The version control code 18 receives the indication of the updated version (block 80). In response, the version control code 18 checks for a conflict between the updated version and the version in the node 12 (if any) (block 82). If a conflict is detected (decision block 84—"yes" leg), the version control code 18 may resolve the conflict (block 86). If no conflict is detected (decision block 84—"no" leg), the version control code 18 may accept the new version, or ignore the new version, in various embodiments.

It is noted that the same node may not both detect the conflict and resolve it, in some cases. A node may detect the conflict, and may persistently record the conflict in the node. Subsequently, the version control code 18 in another node may gather the persisted conflict information and resolve the conflict (or the conflict may be resolved manually by a user). The nodes 12A-12F may support messages to transmit conflict information so that, when a node is prepared to resolve conflicts, that node may retrieve conflict information from other nodes and clear the conflict information from the other nodes after the conflict has been resolved.

Figure 7:
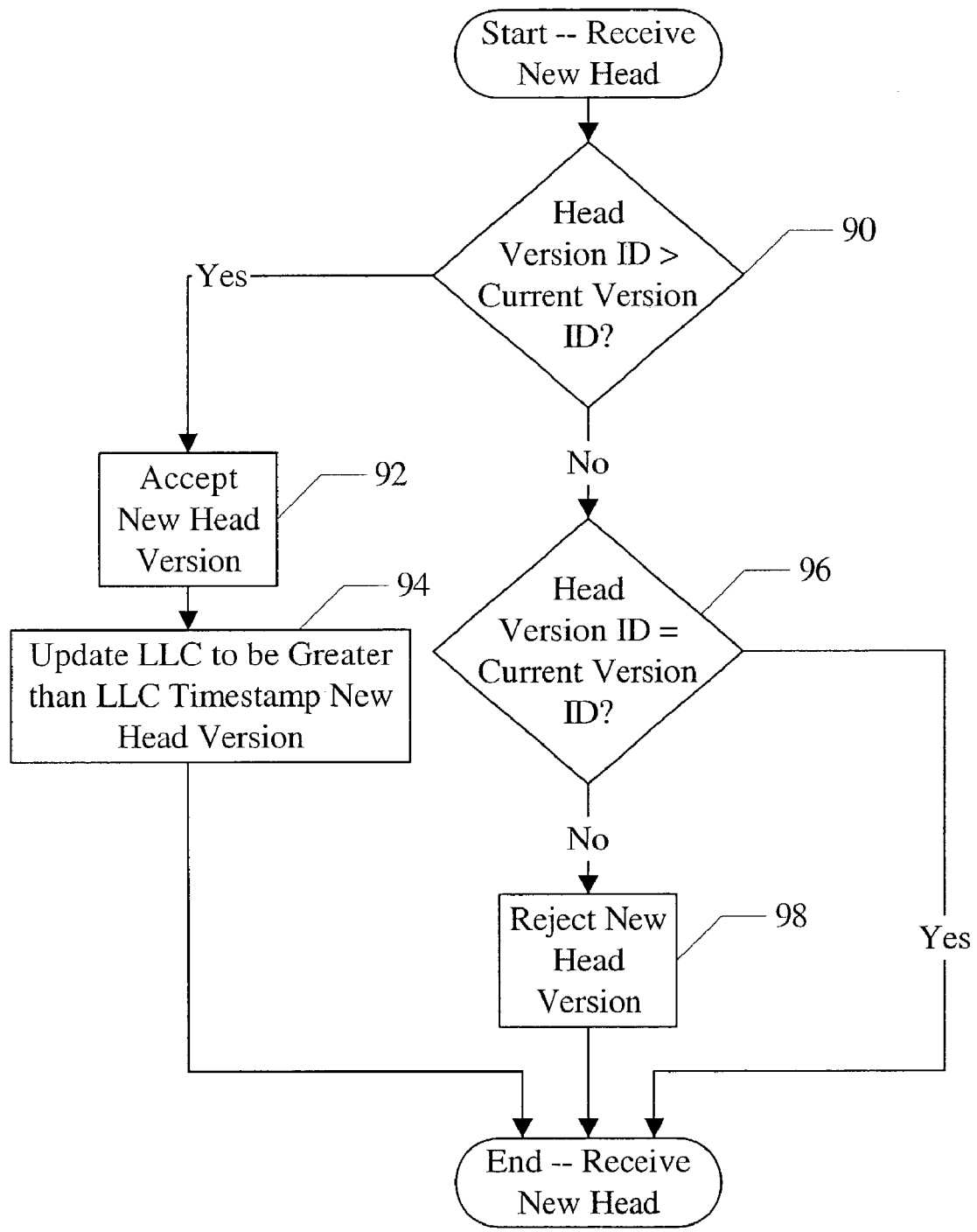
FIG. 7 is a flowchart illustrating operation of a third portion of one embodiment of the version control code when a new head version of an object is received.

Turning next to FIG. 7, a flowchart is shown illustrating additional operation of one embodiment of the version control code 18 in response to receiving a request to set an updated version of an object as the head version. The flowchart of FIG. 7 may represent, in some embodiments, a portion of block 82 in FIG. 6 that is performed if the updated version is requested to become the new head version of the object. While the blocks shown in FIG. 7 are illustrated in a particular order to ease understanding, other orders may be used. Furthermore, blocks may be performed in parallel, in some embodiments.

The version control code 18 may compare the head version ID (e.g. the current version ID 30A from the version descriptor 50 in the request to set new head version) to the current version ID of the object maintained in the node 12 (if any). If the head version ID is greater than the current version ID (decision block 90—"yes" leg), the version control code 18 accepts the new head version (block 92). The version control code 18 may also accept the new head version if the node 12 does not have a copy of the object. Accepting the new head version may include transmitting an acceptance message to the node that requested the new head version, or may include not transmitting a rejection of the new head version, in various embodiments. If the node 12 maintains version information for the object, accepting the new head version may include updating the version information with the new version descriptor. The version control code 18 may also update the LLC 20 in the node 12 to be greater than the LLC timestamp of the new head version (block 94). The LLC is updated if the node 12 includes a copy of the object or maintains version information regarding the object, and may optionally be updated if the node 12 does not include any information regarding the object.

If the head version ID is not greater than the current version ID (decision block 90—"no" leg), the version control code 18 may determine if the head version ID is equal to the current version ID (decision block 96). If the head version ID and the current version ID are equal (decision block 96—"yes" leg), the new head update may be redundant, and the version control code 18 may discard the update.

On the other hand, if the head version ID is less than the current version ID (decision block 90—"no" leg and decision block 96—"no" leg), the version control code 18 may transmit a rejection of the new head version to the requesting node (block 98). The requesting node may abandon its updates in response to the rejection. Alternatively, the requesting node may obtain a new version of the object to make its updates in response to the rejection.

Figure 8:
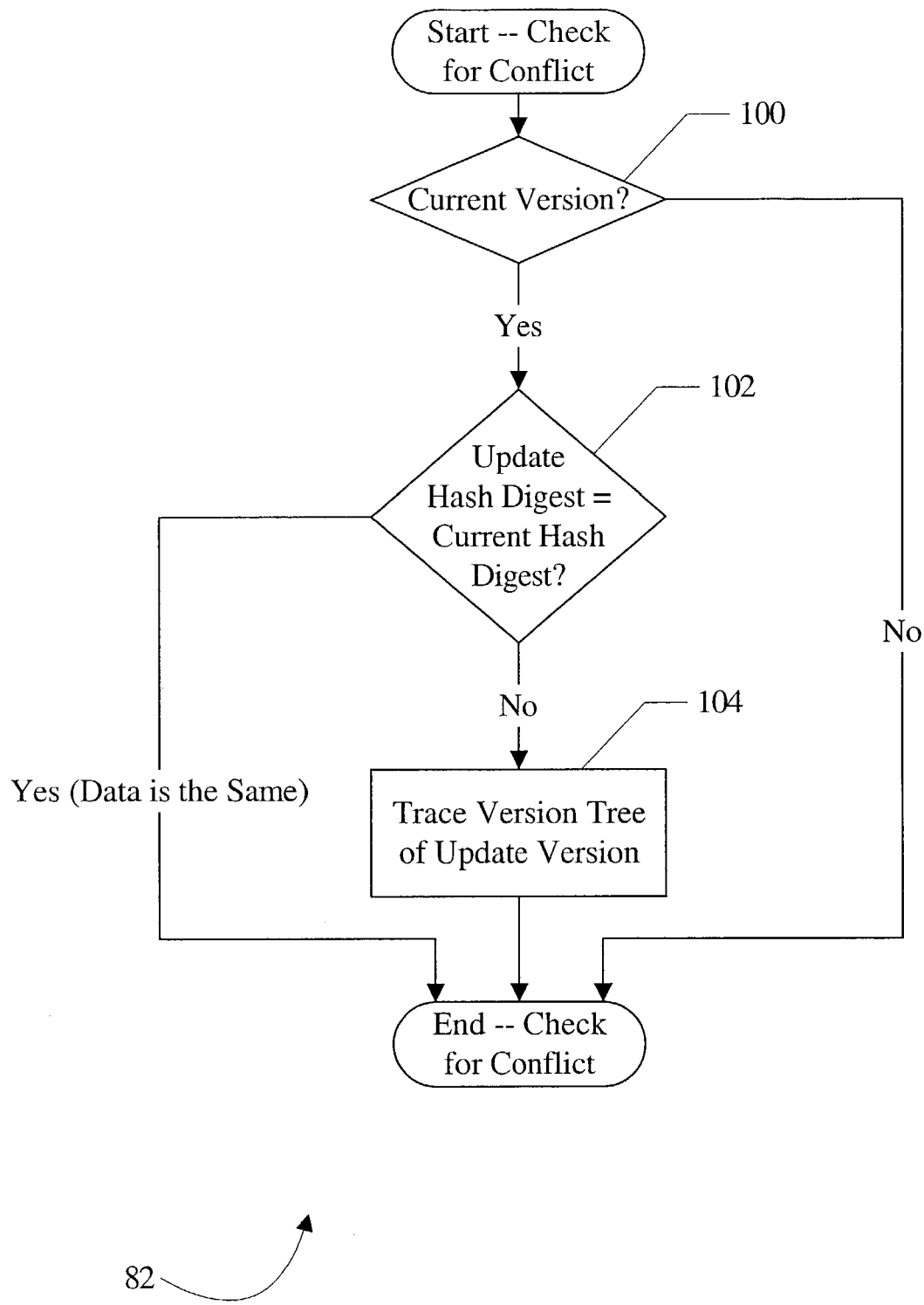
FIG. 8 is a flowchart illustrating one embodiment of a check for conflict operation shown in FIG. 6.

Turning next to FIG. 8, a flowchart illustrating operation of one embodiment of the version control code 18 for checking for a conflict is shown. For example, the flowchart of FIG. 8 may represent block 82 in FIG. 6, in some embodiments. While the blocks shown in FIG. 8 are illustrated in a particular order to ease understanding, other orders may be used. Furthermore, blocks may be performed in parallel, in some embodiments.

The version control code 18 may check if there is a current version of the object in the node 12 (decision block 100). If there is not a current version in the node 12 (decision block 100—"no" leg), then the version control code 18 does not detect a conflict. If there is a current version in the node 12 (decision block 100—"yes" leg), the version control code 18 may compare the hash digest 36 from the received version ID (corresponding to the update) to the hash digest 36 from the current version ID in the node 12 (decision block 102). If the hash digests are equal (decision block 102—"yes" leg) then the data in the update and the current versions is the same, and the version control code 18 does not detect a conflict. If the hash digests are not equal (decision block 102—"no" leg), the version control code 18 traces the version tree of the updated version to determine if the updated version is a descendent of the current version (block 104). That is, the version control code 18 may determine if the updated version is derived form the current version, either directly or indirectly. If the updated version is a descendent of the current version, the updated version is compatible (not conflicting) with the current version. If the updated version is not a descendent of the current version (or if the version control code 18 may not make the determination due to partitions or other factors), then the version control code 18 may record a conflict for the updated version. In the case that the version control code 18 may not make the determination, the recorded conflict may be only a potential conflict.

Figure 9:
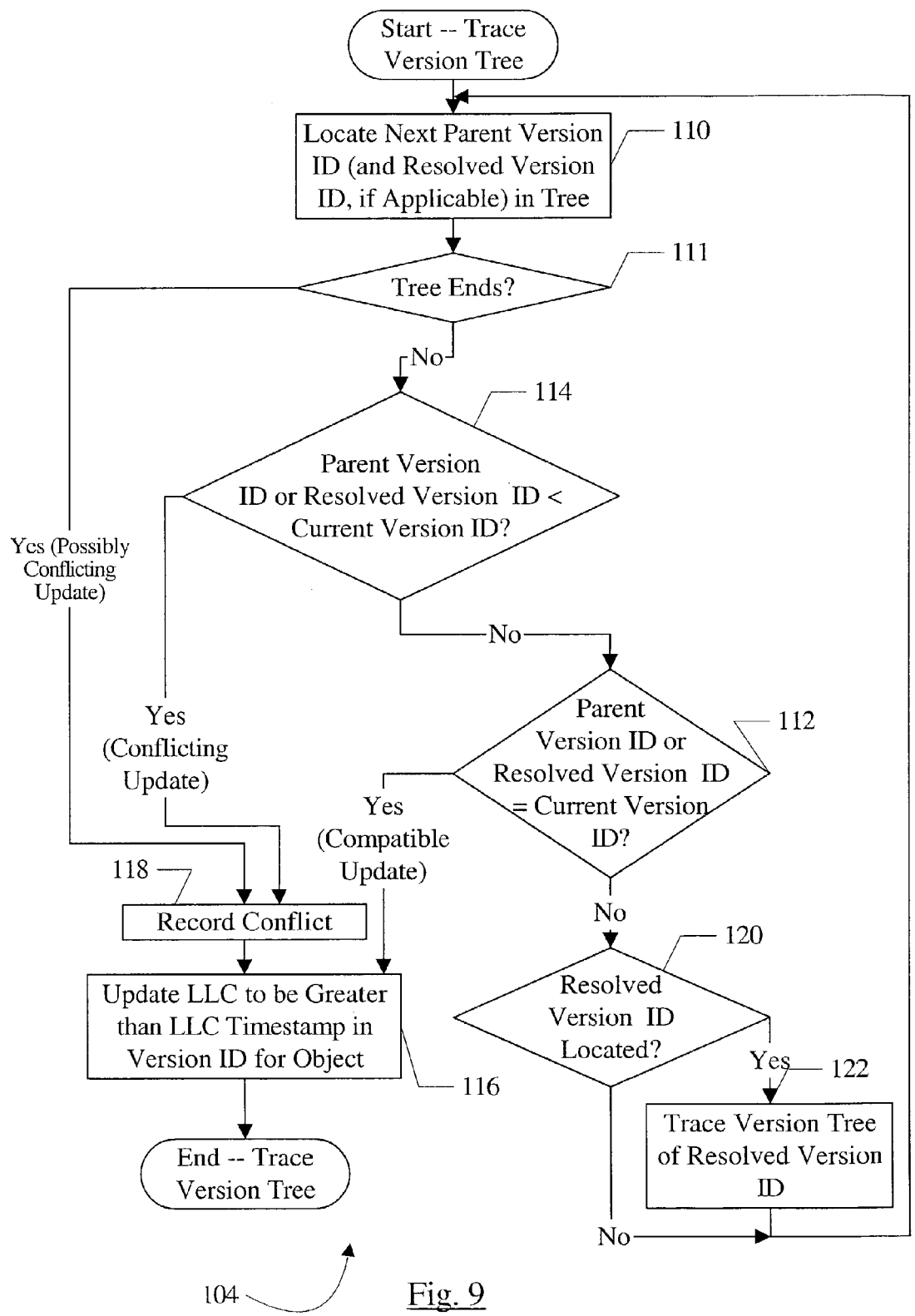
FIG. 9 is a flowchart illustrating one embodiment of a trace version tree operation shown in FIG. 8.

Turning next to FIG. 9, a flowchart is shown illustrating operation of one embodiment of the version control code 18 for tracing the version tree of an updated version. For example, the flowchart of FIG. 9 may represent block 104 in FIG. 8, in some embodiments. While the blocks shown in FIG. 9 are illustrated in a particular order to ease understanding, other orders may be used. Furthermore, blocks may be performed in parallel, in some embodiments.

The version control code 18 may locate the next parent version ID (and resolved version ID, if applicable) in the version tree (block 110). For the first pass through the flowchart of FIG. 9, the next parent version ID may be the parent version ID of the updated version. For subsequent passes, the parent version ID and/or resolved version ID may be located by requesting (from other nodes) the version descriptor of the parent ID from the previous pass.

The version control code 18 may determine if the version tree ends (decision block 111). In the present embodiment, the version tree ends if the parent version ID received in block 110 is the Min version ID 38, or if no parent version ID is returned for the request (e.g. because the version is in another partition). If the version tree ends (decision block 111—"yes" leg), there is a potential conflict but it may not be determined at this time. When the conflict is resolved, it may be discovered that there is actually no conflict. In such a case, the version control code 18 may record a conflict (block 118). Additionally, the version control code 18 may update the LLC 20 to be greater than the LLC timestamp in the version ID corresponding to the updated version (block 116).

If the version tree has not ended (decision block 111—"no" leg), the version control code 18 may compare the parent version ID (and the resolved version ID, if applicable) to the current version ID in the node 12 (decision blocks 112 and 114). The operation of blocks 112 and 114 may be in parallel or in either order, as desired. If either the parent version ID or the resolved version ID is less that the current version ID (decision block 114—"yes" leg), the update is conflicting and a conflict is recorded (block 118). The version control code 18 may update the LLC 20 to be greater than the LLC timestamp in the version ID corresponding to the updated version (block 116).

If neither the parent version ID nor the resolved version ID is less than the current version ID (decision block 114—"no" leg), the version control code checks whether or not either of the parent version ID or the resolved version ID is equal to the current version ID (decision block 112). If either the parent version ID or the resolved version ID is equal to the current version ID (decision block 112—"yes" leg), the update is compatible and no conflict is recorded. The version control code 18 updates the LLC 20 to be greater than the LLC timestamp in the version ID of the updated version (block 116).

If the no leg of decision block 112 is taken, the version control code 18 notes whether or not a resolved version ID is located in the version descriptor (decision block 120) and if so, traces the version tree of the resolved version ID as well as the parent version ID (block 122). Tracing the version tree of the resolved version ID may be done in parallel, recursively as a call to the code represented by the flowchart of FIG. 9, or after reaching the end of the parent version tree, as desired.

Since both the parent version tree and the resolved version tree are traced, and no conflict is recorded if the current version ID is found in the version trees, the version control code 18 may not record a conflict if the current version has been resolved with another version in the updated object's version tree. Thus, conflicts may be raised and resolved once.

Figure 10:
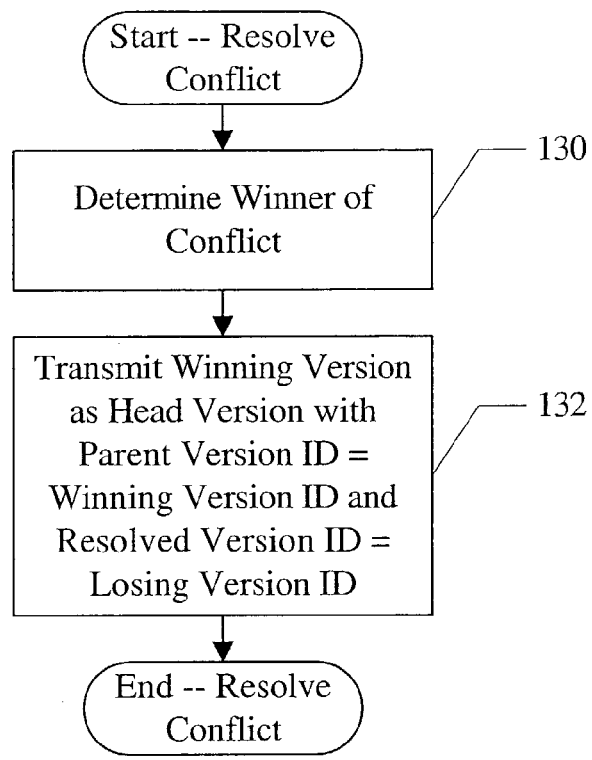
FIG. 10 is a flowchart illustrating one embodiment of a resolve conflict operation shown in FIG. 6.

FIG. 10 is a flowchart illustrating operation of one embodiment of the version control code 18 for resolving a conflict. For example, the flowchart of FIG. 10 may represent block 86 in FIG. 6, in some embodiments. While the blocks shown in FIG. 10 are illustrated in a particular order to ease understanding, other orders may be used. Furthermore, blocks may be performed in parallel, in some embodiments.

The version control code 18 may determine the winner of the conflict (block 130). Any algorithm that can be consistently used in any of the nodes 12A-12F may be used to determine the winner. For example, the version control code 18 may always select the greater version ID (or the lesser version ID) as the winner. Alternatively, a user may select the winning version, if desired.

The version control code 18 transmits the winning version as a new head version (block 132). The version control code 18 generates a new version ID for the new head version. The version control code 18 supplies the new version ID as the current version ID 30A in the version descriptor 50 corresponding to the new head version. Additionally, the version control code 18 supplies the winning version ID as the parent version ID 30B and the losing version ID as the resolved version ID 30C of the version descriptor 50 corresponding to the new head version. Alternatively, the version control code 18 may create the new version and propagate it without identifying it as a new head version, if desired.

Figure 11:
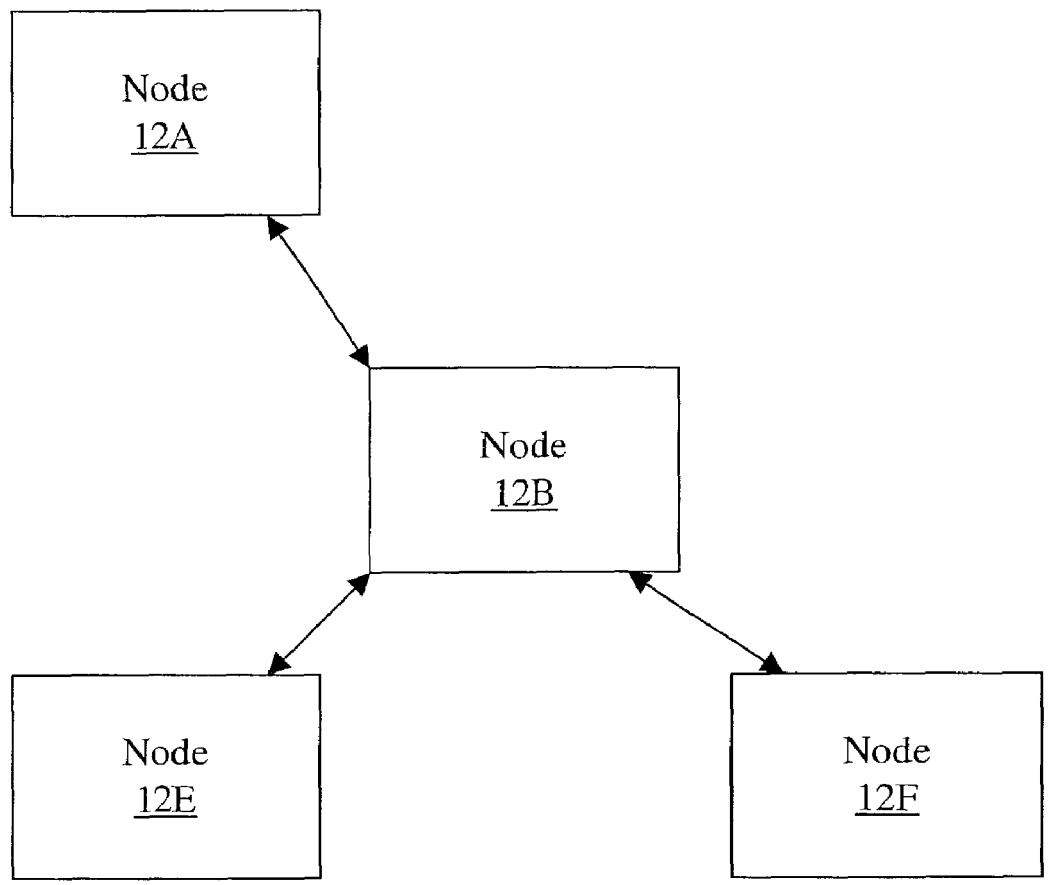
FIG. 11 is a block diagram illustrating a logical interconnection of nodes according to one embodiment of the peer-to-peer network shown in FIG. 1.

Turning next to FIG. 11, additional details regarding one embodiment of a peer-to-peer network 10 are shown. Other embodiments may not employ the operation described with respect to FIG. 11. FIG. 11 illustrates a logical tree of nodes 12A, 12B, 12E and 12F for the object O as shown in FIG. 1. Other objects may have other logical trees that may differ from the tree shown. The tree is logical in the sense that the logical paths between the nodes overlay the physical network. Each path may be realized as an arbitrary route through the underlying physical network. The logical paths are treated by higher level software as the physical connections.

In this embodiment, each node in the logical tree may employ a snooping protocol to collect updates of the object as they pass through the node, and may cache the updates. Thus, objects may tend to be cached close to the nodes that use the objects, which may permit lower latency access to the objects. A node may be a replica node (which maintains a copy of the object, at least temporarily) or an updater node (which updates the object and serves as a well-known source of the object for other nodes). The logical tree may permute over time due to partitioning, due to load-balancing efforts finding a better route for messages in the tree, due to nodes acquiring or releasing the replica or updater responsibilities, etc. At any given point in time, the logical tree may be in transition (e.g. not all routes within the tree may be established). If a message is sent on the tree, the routes may be completed at that time.

Generally, a node may transmit a message onto the logical tree to operate on an object. The message is propagated hop-by-hop through the logical tree. An intermediate node that has a complete response to the message may stop the propagation, as may a node that is a leaf on the tree. Responses propagate back to the initiator node on the tree as well, and are aggregated by intermediate nodes in the tree. For example, in FIG. 11, if the node 12A transmits a message, the message is propagated to node 12B and then to each of nodes 12E and 12F (from the node 12B). The node 12B may await the response from the nodes 12E and 12F, and may aggregate its own response with the responses of the nodes 12E and 12F to form a single response to the node 12A. The aggregated response may be the most reasonable response given the received responses. For example, if some nodes are responding to a version request with a "version unknown" response and another node responds with the version information, the version information response is supplied and the "version unknown" responses are dropped.

To update an object in the embodiment of FIG. 11, for example, a node may transmit a "get version descriptor" message to get the version descriptor for the object. The get version descriptor message may propagate through the logical tree, each node generating a response that is the aggregate of the responses from leaf nodes of that node and the response of that node. If a version descriptor is successfully returned, the node may transmit a "get data" message to get the data that forms the object. Intermediate nodes may cache the data as it is returned to the requesting node. The node may make updates to the object locally, transmitting one or more "add version" messages onto the tree with version descriptors including the new version IDs corresponding to the updated versions. The "add versions" messages may propagate to the updater node or nodes, and may be cached by intermediate nodes along the way. When the node has completed making updates, the node may transmit a "set head version" message to set the latest version as a head version. There may also be messages for getting and removing conflicts for the object.

It is noted that the versioning system described above with regard to FIGS. 1-11 may be used in embodiments in which coherency is enforced for updates to an object as well. In such embodiments, a two-phase commit process is used. The first phase is the prepare phase, in which the updates are generated and transmitted to the other nodes. The versioning system may be used to allow this phase to occur with loose coherency, and the subsequent commit phase may be performed using strict coherency.

Figure 12:
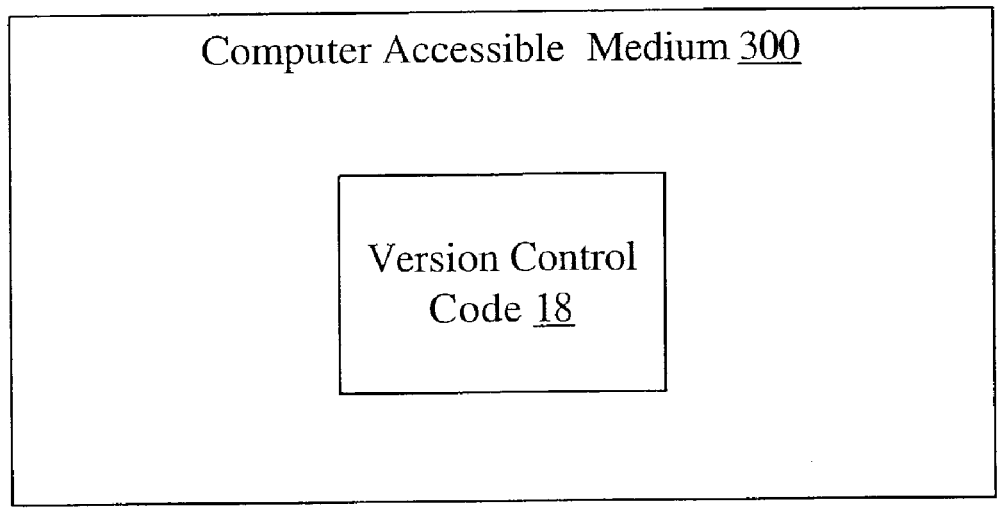
FIG. 12 is a block diagram of one embodiment of a computer readable medium.

Turning now to FIG. 12, a block diagram of a computer accessible medium 300 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 300 stores the version control code 18 (e.g., copies of which may be version control code 18A-18F illustrated in FIG. 1).

Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of nodes interconnected as peers in a peer-to-peer network, wherein each peer has equivalent capabilities and responsibilities, and wherein at least some of the plurality of nodes are configured to update an object, thereby generating a plurality of versions of the object;
wherein any of the plurality of nodes is configured to detect a conflict between content of a first version of the plurality of versions and content of a second version of the plurality of versions;
wherein any of the plurality of nodes is configured to provide an indication of a resolution of the conflict to other ones of the plurality of nodes; and
wherein the other ones of the plurality of nodes are configured not to raise the conflict again responsive to the indication of the resolution;
wherein each of the plurality of nodes that generates one of the plurality of versions is configured to locally generate a version identifier corresponding to that one of the plurality of versions, wherein the plurality of nodes is configured to detect the conflict using the version identifiers;
wherein each version of the plurality of versions is specified via a version descriptor comprising the version identifier generated for that version and a parent-version identifier identifying a parent version of the object from which that version is derived; and
wherein a version tree of the object is traceable via the parent version identifiers in the version descriptors for each version of the object, and wherein a first node of the plurality of nodes has the first version as a current version indicated by a first version identifier in the first node, and wherein the first node is configured to detect the conflict by tracing the version tree of the second version responsive to receiving a second version identifier corresponding to the second version in a second version descriptor identifying the second version.

2. The apparatus as recited in claim 1 wherein the first node detects the conflict if the first version identifier is not in the version tree of the second version.

3. The apparatus as recited in claim 1 wherein the indication of the resolution of the conflict comprises a third version descriptor transmitted by the first node, and wherein, responsive to resolving the first version as the winning version, the third version descriptor includes the first version identifier as the parent version identifier.

4. The apparatus as recited in claim 3, wherein the third version descriptor further includes a resolved version identifier indicative of the version for which the conflict has been resolved, and wherein, responsive to resolving the first version as the winning version, the third version descriptor includes the second version identifier as the resolved version identifier.

5. The apparatus as recited in claim 1 wherein the version identifier comprises a logical timestamp.

6. The apparatus as recited in claim 5 wherein the version identifier further includes a universally unique identifier (uuid) of the object.

7. The apparatus as recited in claim 6 wherein the version identifier further includes a hash digest indicative of a content of the object.

8. The apparatus as recited in claim 1 wherein the object comprises a storage object.

9. The apparatus as recited in claim 1 wherein the object comprises an event in a reliable messaging system, and wherein updates to the object comprise messages.

10. The apparatus as recited in claim 1 wherein the object comprises a workflow object.

11. An apparatus comprising:
a plurality of nodes interconnected as peers in a peer-to-peer network, wherein at least some of the plurality of nodes are configured to update an object, thereby generating a plurality of versions of the object;
wherein each of the plurality of nodes that generates a respective one of the plurality of versions is configured to locally generate a version identifier corresponding to the respective one of the plurality of versions;
wherein the plurality of nodes are configured to detect conflicting updates in the plurality of versions responsive to the version identifiers corresponding to the conflicting updates;
wherein each version of the plurality of versions is specified via a version descriptor comprising the version identifier generated for that version and a parent version identifier identifying a parent version of the object from which that version is derived; and
wherein a version tree of the object is traceable via the parent version identifiers in the version descriptors for each version of the object, and wherein a first node of the plurality of nodes has a first version as a current version indicated by a first version identifier in the first node, and wherein the first node is configured to detect the conflict by tracing the version tree of a second version responsive to receiving a second version identifier corresponding to the second version in a second version descriptor identifying the second version.

12. The apparatus as recited in claim 11 wherein the first node detects the conflict if the first version identifier is not in the version tree of the second version.

13. The apparatus as recited in claim 11 wherein, in response to a resolution of a conflict, the first node is configured to transmit a third version descriptor, and wherein, responsive to resolving the first version as the winning version, the third version descriptor includes the first version identifier as the parent version identifier.

14. The apparatus as recited in claim 13, wherein the third version descriptor further includes a resolved version identifier indicative of the version for which the conflict has been resolved, and wherein, responsive to resolving the first version as the winning version, the third version descriptor includes the second version identifier as the resolved version identifier.

15. In a plurality of nodes interconnected as peers in a peer-to-peer network, wherein each peer has equivalent capabilities and responsibilities, and wherein at least some of the plurality of nodes are configured to update an object, thereby generating a plurality of versions of the object, a method comprising:
detecting a conflict between content of a first version of the plurality of versions and content of a second version of the plurality of versions in any of the plurality of nodes;
providing an indication of a resolution of the conflict to other ones of the plurality of nodes from any of the plurality of nodes; and
not raising the conflict again in the other ones of the plurality of nodes responsive to the indication of the resolution;
each of the plurality of nodes that generates one of the plurality of versions locally generating a version identifier corresponding to that one of the plurality of versions, and wherein the detecting is performed using the version identifiers; and
wherein each version of the plurality of versions is specified via a version descriptor comprising the version identifier generated for that version and a parent version identifier identifying a parent version of the object from which that version is derived, and wherein a version tree of the object is traceable via the parent version identifiers in the version descriptors for each version of the object, and wherein a first node of the plurality of nodes has the first version as a current version indicated by a first version identifier in the first node, and wherein the detecting the conflict comprises tracing the version tree of the second version by the first node responsive to receiving a second version identifier corresponding to the second version in a second version descriptor identifying the second version.

16. The method as recited in claim 15 wherein the first node detects the conflict if the first version identifier is not in the version tree of the second version.

17. The method as recited in claim 15 wherein the indication of the resolution of the conflict comprises a third version descriptor transmitted by the first node, and wherein, responsive to resolving the first version as the winning version, the third version descriptor includes the first version identifier as the parent version identifier.

18. The method as recited in claim 17, wherein the third version descriptor further includes a resolved version identifier indicative of the version for which the conflict has been resolved, and wherein, responsive to resolving the first version as the winning version, the third version descriptor includes the second version identifier as the resolved version identifier.

19. A computer readable medium comprising one or more instructions which, when executed in a first node of a plurality of nodes coupled as peers in a peer-to-peer network, wherein each peer has equivalent capabilities and responsibilities, a method comprising:
detect a conflict between content of a first version of a plurality of versions of an object and content of a second version of the plurality of versions;
provides an indication of a resolution of the conflict to other ones of the plurality of nodes; and
in response to receiving an indication of the resolution, do not raise the conflict again even if the conflict is detected again;
wherein the one or more instructions, when executed, locally generate a version identifier corresponding to one of the plurality of versions that is generated in the first node, wherein detecting a conflict is performed using version identifiers; and
wherein each version of the plurality of versions is specified via a version descriptor comprising the version identifier generated for that version and a parent version identifier identifying a parent version of the object from which that version is derived, and wherein a version tree of the object is traceable via the parent version identifiers in the version descriptors for each version of the object, and wherein the first node has the first version as a current version indicated by a first version identifier in the first node, and wherein the one or more instructions, when executed, detect the conflict by tracing the version tree of the second version responsive to receiving a second version identifier corresponding to the second version in a second version descriptor identifying the second version.

20. The computer readable medium as recited in claim 19 wherein the one or more instructions, when executed, detect the conflict if the first version identifier is not in the version tree of the second version.

21. The computer readable medium as recited in claim 19 wherein the indication of the resolution of the conflict comprises a third version descriptor transmitted by the first node, and wherein, responsive to resolving the first version as the winning version, the one or more instructions, when executed, include the first version identifier as the parent version identifier in the third version descriptor.

22. The computer readable medium as recited in claim 21, wherein the third version descriptor further includes a resolved version identifier indicative of the version for which the conflict has been resolved, and wherein, responsive to resolving the first version as the winning version, the one or more instructions, when executed, include the second version identifier as the resolved version identifier in the third version descriptor.

23. An apparatus comprising:
a plurality of nodes interconnected as peers in a peer-to-peer network, wherein at least some of the plurality of nodes are configured to update an object, thereby generating a plurality of versions of the object;
wherein each of the plurality of nodes that generates a respective one of the plurality of versions is configured to locally generate a version identifier corresponding to the respective one of the plurality of versions;
wherein each version of the plurality of versions is specified via a version descriptor comprising the version identifier generated for that version and a parent version identifier identifying a parent version of the object from which that version is derived; and
wherein a version tree of the object is traceable via the parent version identifiers in the version descriptors for each version of the object, and wherein a first node of the plurality of nodes that has a first version as a current version indicated by a first version identifier in the first node is configured to detect a conflict by tracing the version tree of a second version responsive to receiving a second version identifier corresponding to the second version in a second version descriptor identifying the second version.

24. The apparatus as recited in claim 23 wherein the first node detects the conflict if the first version identifier is not in the version tree of the second version.

25. The apparatus as recited in claim 23 wherein, in response to a resolution of a conflict, the first node is configured to transmit a third version descriptor, and wherein, responsive to resolving the first version as the winning version, the third version descriptor includes the first version identifier as the parent version identifier.

26. The apparatus as recited in claim 25, wherein the third version descriptor further includes a resolved version identifier indicative of the version for which the conflict has been resolved, and wherein, responsive to resolving the first version as the winning version, the third version descriptor includes the second version identifier as the resolved version identifier.

27. The apparatus as recited in claim 23 wherein the other ones of the plurality of nodes are configured not to raise the conflict again responsive to the indication of the resolution.

28. The apparatus as recited in claim 23 wherein the version identifier comprises a logical timestamp.

29. The apparatus as recited in claim 28 wherein the version identifier further includes a universally unique identifier (uuid) of the object.

30. The apparatus as recited in claim 29 wherein the version identifier further includes a hash digest indicative of a content of the object.

31. The apparatus as recited in claim 23 wherein the object comprises a storage object.

32. The apparatus as recited in claim 23 wherein the object comprises an event in a reliable messaging system, and wherein updates to the object comprise messages.

33. The apparatus as recited in claim 23 wherein the object comprises a workflow object.

34. A computer accessible medium storing a plurality of instructions which, when executed on a node that is one of a plurality of nodes interconnected as peers in a peer-to-peer network:
locally generates a version identifier corresponding to a locally modified version of the object responsive to a modification of the object;
forms a version descriptor comprising the version identifier generated for the locally modified version and a parent version identifier identifying a parent version of the object from which that version is derived; and
wherein a version tree of the object is traceable via the parent version identifiers in the version descriptors for each version of the object, and wherein the plurality of instructions, when executed, detect a conflict by tracing the version tree of a second version responsive to receiving a second version identifier corresponding to the second version in a second version descriptor identifying the second version.

35. The computer accessible medium as recited in claim 34 wherein the conflict is detected if the version identifier is not in the version tree of the second version.

36. The computer accessible medium as recited in claim 34 wherein the plurality of instructions, when executed and in response to a resolution of a conflict, transmit a third version descriptor, and wherein, responsive to resolving the version as the winning version, the third version descriptor includes the version identifier as the parent version identifier.

37. The computer accessible medium as recited in claim 36, wherein the third version descriptor further includes a resolved version identifier indicative of the version for which the conflict has been resolved, and wherein, responsive to resolving the version as the winning version, the third version descriptor includes the second version identifier as the resolved version identifier.

38. The computer accessible medium as recited in claim 34 wherein the version identifier comprises a logical timestamp.

39. The computer accessible medium as recited in claim 38 wherein the version identifier further includes a universally unique identifier (uuid) of the object.

40. The computer accessible medium as recited in claim 39, wherein the version identifier further includes a hash digest indicative of a content of the object.

41. The computer accessible medium as recited in claim 34 wherein the object comprises a storage object.

42. The computer accessible medium as recited in claim 34 wherein the object comprises an event in a reliable messaging system, and wherein updates to the object comprise messages.

43. The computer accessible medium as recited in claim 34 wherein the object comprises a workflow object.

* * * * *